United States Patent
Hummel et al.

(10) Patent No.: US 7,543,131 B2
(45) Date of Patent: Jun. 2, 2009

(54) CONTROLLING AN I/O MMU

(75) Inventors: Mark D. Hummel, Franklin, MA (US);
Andrew W. Lueck, Austin, TX (US);
Geoffrey S. Strongin, Austin, TX (US);
Mitchell Alsup, Austin, TX (US);
Michael J. Haertel, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 250 days.

(21) Appl. No.: 11/503,390

(22) Filed: Aug. 11, 2006

(65) Prior Publication Data

US 2007/0038839 A1 Feb. 15, 2007

Related U.S. Application Data

(60) Provisional application No. 60/759,826, filed on Jan. 17, 2006, provisional application No. 60/707,629, filed on Aug. 12, 2005.

(51) Int. Cl.
*G06F 12/08* (2006.01)
(52) U.S. Cl. .................. 711/202; 711/154; 711/203; 711/205; 711/206; 711/207; 710/5; 710/36; 710/39
(58) Field of Classification Search .................. 711/154, 711/202–203, 205–207; 710/5, 36, 39
See application file for complete search history.

(56) References Cited

U.S. PATENT DOCUMENTS

| 3,970,999 | A | 7/1976 | Edward |
| 4,550,368 | A | 10/1985 | Bechtolsheim |
| 5,301,287 | A | 4/1994 | Herrell et al. |
| 5,317,710 | A | 5/1994 | Ara et al. |
| 5,949,436 | A | 9/1999 | Horan et al. |
| 5,987,557 | A | 11/1999 | Ebrahim |
| 6,065,088 | A | 5/2000 | Bronson et al. |
| 6,119,204 | A | 9/2000 | Chang et al. |
| 6,622,193 | B1 * | 9/2003 | Avery .......................... 710/263 |
| 6,886,171 | B2 | 4/2005 | MacLeod |
| 6,888,843 | B2 | 5/2005 | Keller et al. |
| 6,901,474 | B2 | 5/2005 | Lym et al. |
| 6,928,529 | B2 | 8/2005 | Shinomiya |
| 6,938,094 | B1 | 8/2005 | Keller et al. |

(Continued)

OTHER PUBLICATIONS

U.S. Appl. No. 11/503,391, entitled "Avoiding silent data corruption and data leakage in a virtual environment with multiple guests".

(Continued)

*Primary Examiner*—Jasmine Song
(74) *Attorney, Agent, or Firm*—Lawrence J. Merkel; Meyertons, Hood, Kivlin, Kowert & Goetzel, P.C.

(57) ABSTRACT

In an embodiment, a computer system comprises a processor; a memory management module comprising a plurality of instructions executable on the processor; a memory coupled to the processor; and an input/output memory management unit (IOMMU) coupled to the memory. The IOMMU is configured to implement address translation and memory protection for memory operations sourced by one or more input/output (I/O) devices. The memory stores a command queue during use. The memory management module is configured to write one or more control commands to the command queue, and the IOMMU is configured to read the control commands from the command queue and execute the control commands.

32 Claims, 6 Drawing Sheets

U.S. PATENT DOCUMENTS

| | | |
|---|---|---|
| 7,073,043 B2 | 7/2006 | Arimilli et al. |
| 7,190,694 B2 | 3/2007 | Sato et al. |
| 2002/0083254 A1 | 6/2002 | Hummel et al. |
| 2006/0075146 A1 | 4/2006 | Schoinas et al. |
| 2006/0277348 A1 | 12/2006 | Wooten |

OTHER PUBLICATIONS

U.S. Appl. No. 11/503,375, entitled "Ensuring deadlock free operation for peer to peer traffic in an input/output memory management unit (IOMMU)".

Motorola, "PowerPC 601 RISC Microprocessor User's Manual," 1993, Chapter 6 "Memory Management Unit," International Business Machines Corporation.

AMD, "AMD x86-64 Architecture Programmer's Manual," Sep. 2002, Chapter 5, "Page Translation and Protection," pp. 143-176.

Office Action from U.S. Appl. No. 11/503,391 mailed Sep. 18, 2008.

Response to Office Action from U.S. Appl. No. 11/503,391 filed Dec. 11, 2008.

* cited by examiner

| RSVD | | DeviceID[15:0] |
|---|---|---|
| EvtCd[3:0] | Event_Specific | DomainID[15:0] |
| Address[31:0] | | |
| Address[63:32] | | |

Event Log Entry 150

CONTROLLING AN I/O MMU

This application claims benefit of priority to U.S. Provisional Patent Application Ser. No. 60/707,629 filed Aug. 12, 2005. This application also claims benefit of priority to U.S. Provisional Patent Application Ser. No. 60/759,826 filed Jan. 17, 2006. The above provisional applications are incorporated herein by reference. To the extent that any material in the provisional applications conflicts with material expressly set forth herein, the material herein controls.

BACKGROUND

1. Field of the Invention

This invention is related to the field of computer systems and, more particularly, to memory management units for input/output (I/O) devices.

2. Description of the Related Art

Computer systems of various types are ubiquitous in modern society, including personal computers (PCs), workstations, servers, various personal digital assistant (PDA) devices, etc. Most, if not all, of these computer systems have implemented memory management functionality for processor accesses to memory. Generally, the memory management functionality has included translating addresses from a virtual address space used by each process to a physical address space that spans the actual system memory, along with various memory protections (e.g. read only, read/write, privilege level requirements, etc.). The memory management functionality has a variety of uses: protecting the memory used by each process from unauthorized access by other processes; permitting large virtual spaces to be used by processes even if the physical memory system is not that large; relocation of virtual addresses to available physical memory without the participation of the process; etc.

While the processor addresses are frequently translated, addresses used by input/output (I/O) devices in computer systems are generally not translated. That is, the I/O devices use physical addresses to access memory. In a single operating system (OS) computer system, such as most PCs, the OS controls access to the I/O devices by other processes (applications and OS services). Accordingly, the OS can control which process has access to a given device at any given point in time, and can at least somewhat control the addresses accessed by the device. However, such mechanisms become more complicated and cumbersome in virtual machine systems, which may have multiple guest OSs running on a virtual machine monitor. Additionally, devices' use of physical addresses reduces the overall security of the system, since a rogue device (or a device programmed by a malicious software agent) can access memory unimpeded.

Some systems (particularly mainframe computer systems) have implemented virtualization of I/O. However, those virtual I/O systems are not designed for the topologies that often exist in PCs.

SUMMARY

In one embodiment, a method comprises creating a command queue in a memory of a computer system that also includes an input/output memory management unit (IOMMU). The IOMMU is configured to implement address translation and memory protection for memory requests sourced by one or more input/output (I/O) devices in the system. The method comprises writing one or more control commands to the command queue by a memory management module executable on a processor in the computer system. The method still further comprises the IOMMU reading the control commands from the command queue and executing the commands.

In an embodiment, a computer system comprises a processor; a memory management module comprising a plurality of instructions executable on the processor; a memory coupled to the processor; and an IOMMU coupled to the memory. The IOMMU is configured to implement address translation and memory protection for memory operations sourced by one or more input/output (I/O) devices. The memory stores a command queue during use. The memory management module is configured to write one or more control commands to the command queue, and the IOMMU is configured to read the control commands from the command queue and execute the control commands.

In one embodiment, an IOMMU comprises one or more control registers programmable to locate a command queue in memory; a cache to cache translation data from memory; and a control logic coupled to the cache and the control registers. The control logic is configured to execute the control commands from the command queue, and to implement address translation and memory protection for memory requests sourced from one or more input/output (I/O) devices.

BRIEF DESCRIPTION OF THE DRAWINGS

The following detailed description makes reference to the accompanying drawings, which are now briefly described.

Figure 1:
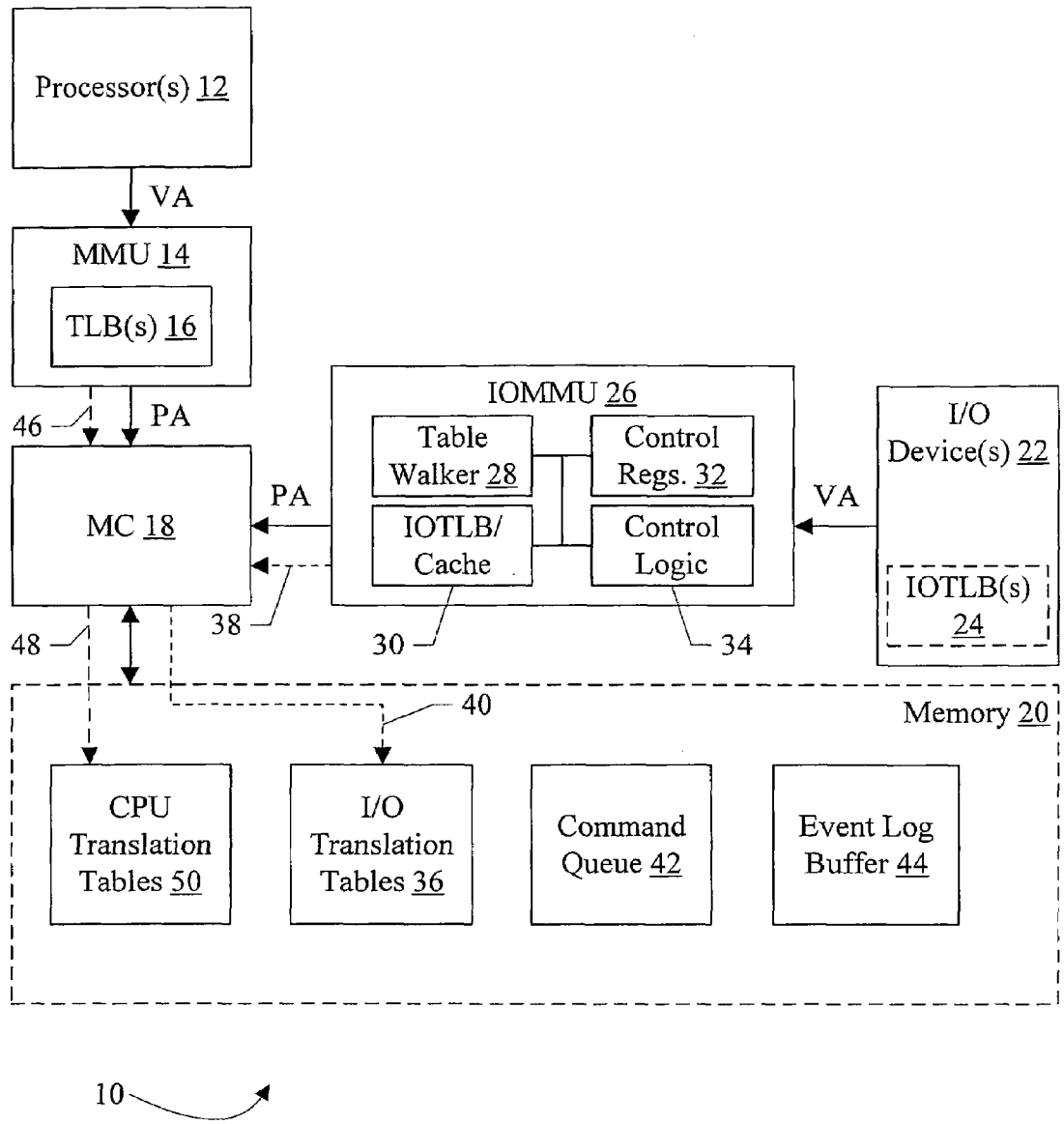
FIG. 1 is a block diagram of a high level view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 is a block diagram illustrating a simplified, high level view of one embodiment of a computer system 10. In the illustrated embodiment, the system 10 includes one or more processors 12, a memory management unit 14 comprising one or more translation lookaside buffers (TLBs) 16, a memory controller (MC) 18, a memory 20, one or more I/O devices 22 which may comprise one or more I/O TLBs (IOTLBs) 24, and an I/O MMU (IOMMU) 26 which may comprise a table walker 28, an IOTLB/cache 30, control registers 32, and control logic 34. The processors 12 are coupled to the MMU 14, which is coupled to the memory controller 18. The I/O devices 22 are coupled to the IOMMU 26, which is coupled to the memory controller 18. Within the IOMMU 26, the table walker 28, the IOTLB 30, the control registers 32, and the control unit 34 are coupled.

As illustrated in FIG. 1, the path from the I/O devices 22 to the memory 20 is at least partially separate from the path of the processors 12 to the memory 20. Specifically, the path from the I/O devices 22 to memory 20 does not pass through the MMU 14. Accordingly, the MMU 14 may not provide memory management for the memory requests sourced from the I/O devices 22. Generally, memory management may comprise address translation from a virtual address (VA in FIG. 1) to a physical address (PA in FIG. 1) and memory protection. Memory protection may control read and/or write access to the memory at some level of granularity (e.g. a page), along with various other attributes such as privilege level requirements, cacheability and cache controls (e.g. writethrough or writeback), coherency, etc. Any set of memory protections may be implemented in various embodiments. In some embodiments, the memory protections implemented by the IOMMU 26 may differ from the memory protections implemented by the MMU 14, in at least some respects. In one embodiment, the memory protections implemented by the IOMMU 26 may be defined so that the translation tables storing the translation data used by the IOMMU 26 and the MMU 14 may be shared (although shown separately in FIG. 1 for ease of discussion). Other embodiments may not share translation tables between the IOMMU 26 and the MMU 14, as desired.

Generally, the I/O devices 22 may be configured to generate memory requests, such as memory read and write requests, to access memory locations in the memory 20. The memory requests may be part of a direct memory access (DMA) read or write operation, for example. The DMA operations may be initiated by software executed by the processors 12, programming the I/O devices 22 directly or indirectly to perform the DMA operations. Among other things, the I/O devices 22 may be provided with virtual addresses to access the memory 20. The virtual addresses may be translated by the IOMMU 26 to corresponding physical addresses to access the memory, and the physical addresses may be provided to the memory controller 18 for access. That is, the IOMMU 26 may modify the memory requests sourced by the I/O devices 22 to change the virtual address in the request to a physical address, and the memory request may be forwarded to the memory controller 18 to access the memory 20.

The IOMMU uses a set of I/O translation tables 36 stored in the memory 20 to translate the addresses of memory requests from the I/O devices 22. Generally, translation tables may be tables of translation data that can be used to translate virtual addresses to physical addresses. The translation tables may store the translation data in any fashion. For example, in one embodiment, the I/O translation tables 36 may include page tables similar to those defined in the x86 and AMD64™ instruction set architectures. Various subsets of the virtual address bits may be used to index levels of the table, and each level may either be the end of translation (i.e. storing a real page number for the translation) or may point to another table (indexed by another set of virtual address bits). The page may be the unit of translation (i.e. each address in the virtual page translates to the same physical page). Pages may have varying sizes, from 4 kilobytes up to Megabytes or even Gigabytes. Additionally, the translation tables 36 may include a device table that maps devices to sets of page tables (e.g. by device identifier). The device identifier may be defined in a variety of ways, and may be dependent on the peripheral interconnect to which the device is attached. For example, Peripheral Component Interconnect (PCI) devices may form a device identifier from the bus number, device number and function number. HyperTransport™ devices may use a bus number and unit ID to form a device identifier.

Specifically, the IOMMU 26 illustrated in FIG. 1 may include the table walker 28 to search the I/O translation tables 36 for a translation for a given memory request. The table walker 28 may generate memory requests, e.g. read memory requests, to read the translation data from the translation tables 36. The translation table reads are illustrated by dotted arrows 38 and 40 in FIG. 1.

To facilitate more rapid translations, the IOMMU may cache some translation data. For example, the IOTLB 30 may be a form of cache, which caches the result of previous translations, mapping virtual page numbers to real page numbers and corresponding translation data. If a translation is not found in the IOTLB 30 for the given memory request, the table walker 28 may be invoked. In various embodiments, the table walker 28 may be implemented in hardware, or in a microcontroller or other processor and corresponding executable code (e.g. in a read-only memory (ROM) in the IOMMU 26). Additionally, other caches may be included to cache page tables, or portions thereof, and/or device tables, or portions thereof, as part of IOTLB/cache 30

The control logic 34 may be configured to access the IOTLB 30 to detect a hit/miss of the translation for a given memory request, and may invoke the table walker. The control logic 34 may also be configured to modify the memory request from the I/O device with the translated address, and to forward the request upstream toward the memory controller. Additionally, the control logic 34 may control various functionality in the IOMMU 26 as programmed into the control registers 32. For example, the control registers 32 may define an area of memory to be a command queue 42 for memory management software to communicate control commands to the IOMMU 26, in this embodiment. The control logic 34 may be configured to read the control commands from the command queue 42 and execute the control commands. Similarly, the control registers 32 may define another area of memory to be an event log buffer 44. The control logic 34 may detect various events and write them to the event log buffer 44. The events may include various errors detected by the control logic 34 with respect to translations and/or other functions of the IOMMU 26.

The I/O devices 22 may comprise any devices that communicate between the computer system 10 and other devices, provide human interface to the computer system 10, provide storage (e.g. disk drives, compact disc (CD) or digital video disc (DVD) drives, solid state storage, etc.), and/or provide enhanced functionality to the computer system 10. For example, the I/O devices 22 may comprise one or more of: network interface cards, integrated network interface functionality, modems, video accelerators, audio cards or integrated audio hardware, hard or floppy disk drives or drive controllers, hardware interfacing to user input devices such as keyboard, mouse, tablet, etc., video controllers for video displays, printer interface hardware, bridges to one or more peripheral interfaces such as PCI, PCI express, PCI-X, USB, firewire, SCSI (Small Computer Systems Interface), etc., sound cards, and a variety of data acquisition cards such as GPIB or field bus interface cards, etc. The term "peripheral device" may also be used to describe some I/O devices.

In some cases, one or more of the I/O devices 22 may also comprise an IOTLB, such as IOTLBs 24. In such cases, the memory requests that have already been translated may be marked in some fashion so that the IOMMU 26 does not attempt to translate the memory request again.

The memory controller 18 may comprise any circuitry designed to interface between the memory 20 and the rest of the system 10. The memory 20 may comprise any semiconductor memory, such as one or more RAMBUS DRAMs (RDRAMs), synchronous DRAMs (SDRAMs), DDR SDRAM, static RAM, etc. The memory 20 may be distributed in a system, and thus there may be multiple memory controllers 18.

The MMU 14 may comprise a memory management unit for memory requests sourced by a processor 12. The MMU may include TLBs 16, as well as table walk functionality. When a translation is performed by the MMU 14, the MMU 14 may generate translation memory requests (e.g. shown as dotted arrows 46 and 48 in FIG. 1) to the CPU translation tables 50. The CPU translation tables 50 may store translation data as defined in the instruction set architecture implemented by the processors 12.

The processors 12 may comprise any processor hardware, implementing any desired instruction set architecture. In one embodiment, the processors 12 implement the x86 architecture, and more particularly the AMD64™ architecture. Various embodiments may be superpipelined and/or superscalar. Embodiments including more than one processor 12 may be implemented discretely, or as chip multiprocessors (CMP) and/or chip multithreaded (CMT).

Figure 2:
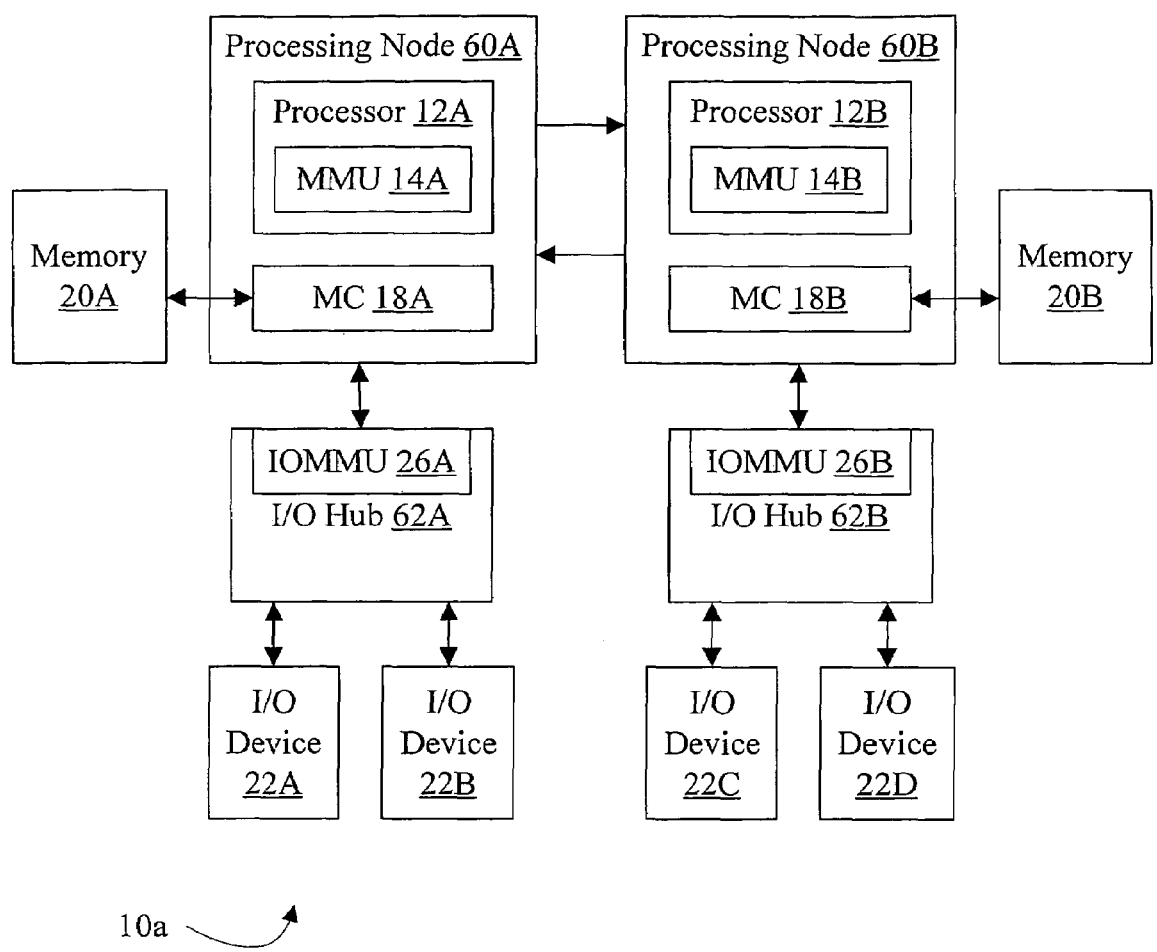
FIG. 2 is a block diagram of a more detailed embodiment of a computer system.

The system 10 illustrates high level functionality of the system, and the actual physical implementation may take many forms. For example, the MMU 14 is commonly integrated into each processor 12. FIG. 2 is one example of a more detailed embodiment. The example illustrated in FIG. 2 may be based on the HyperTransport™ (HT) coherent fabric between processor nodes and the HT I/O link between processor nodes and I/O device or I/O hubs that bridge to other peripheral interconnects. I/O hubs are shown in the example of FIG. 2. Alternatively, any other coherent interconnect may be used between processor nodes and/or any other I/O interconnect may be used between processor nodes and the I/O devices. Furthermore, another example may include processors coupled to a Northbridge, which is further coupled to memory and one or more I/O interconnects, in a traditional PC design.

In the illustrated embodiment, the system 10*a* comprises processing nodes 60A-60B, which respectively comprise processors 12A-12B further comprising MMUs 14A-14B. The processor nodes 60A-60B also comprise memory controllers 18A-18B. Each of processors 12A-12B may be an instance of a processor 12 as mentioned above. Similarly, each of MMUs 14A-14B and memory controllers 18A-18B may be instances of the MMU 14 and memory controller 18 shown in FIG. 1. In the illustrated embodiment, the MMU functionality is incorporated into the processor.

The system 10*a* includes a distributed memory system, comprising memories 20A-20B. The physical address space may be distributed over the memories 20A-20B. Accordingly, a given memory request specifying a given address is routed to the memory controller 18A or 18B coupled to the memory 20A or 20B to which that given address is assigned.

Memory requests from the I/O devices (e.g. I/O devices 22A-22D, coupled to I/O Hubs 62A-62B as illustrated in FIG. 2) may not all take the same path to arrive at the memory controller 18A-18B that will service the request. For example, the I/O devices 22A-22B may transmit memory requests to the I/O hub 62A, which transmits the requests to the processing node 60A. If the address of a given memory request is assigned to the memory 20B, the processing node 60A may transmit the given memory request to the processing node 60B, so that the memory controller 18B may receive and process the request. The I/O devices 22C-22D may transmit memory requests to the I/O Hub 62B, which may transmit the requests to the processing node 60B. If the address of a given memory request is assigned to the memory 20A, the processing node 60B may transmit the given memory request to the processing node 60A.

The IOMMU may be placed anywhere along the path between I/O-sourced memory requests and the memory 20. In the illustrated embodiment, IOMMUs 26A-26B are included in the I/O hubs 62A-62B. Thus, any memory requests sourced by an I/O device coupled to the corresponding hub may be translated by the IOMMU in the I/O hub. Other embodiments may locate the IOMMU in different places, from IOTLBs in the I/O devices to IOMMUs within the processing nodes 60A-60B, or even IOMMUs at the memory controllers 18A-18B. Still further, IOMMUs may be located at different points in different parts of the system.

Figure 3:
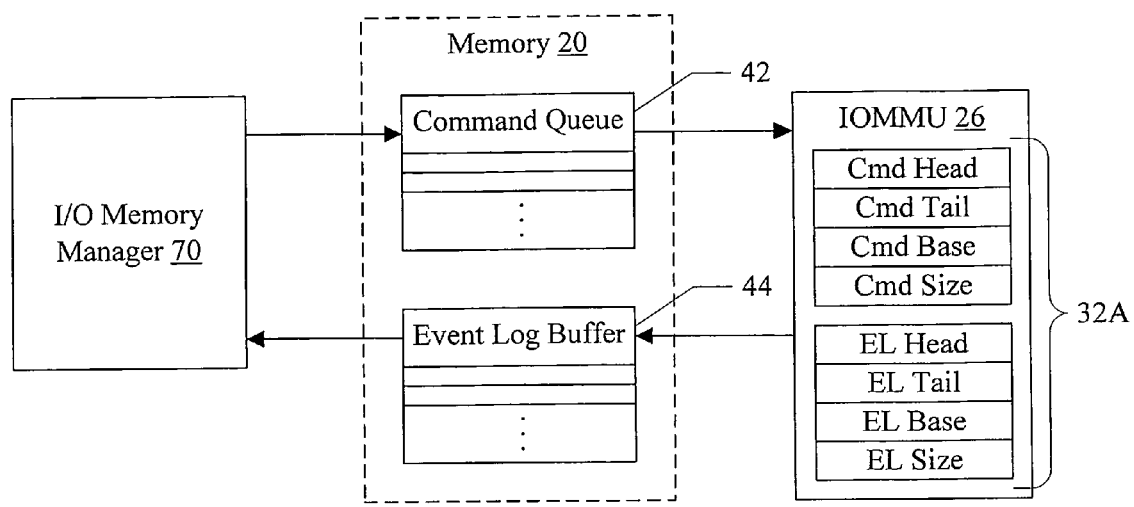
FIG. 3 is a block diagram illustrating a communication and control mechanism for one embodiment of an I/O memory management unit (IOMMU).

Turning next to FIG. 3, a block diagram is shown illustrating one embodiment of a communication mechanism between the IOMMU 26 and an I/O memory manager 70. The memory 20 is also shown, including the command queue 42 and event log buffer 44 illustrated in FIG. 1. A number of control registers 32A, part of the control registers 32, are shown in FIG. 3 as well. The control registers 32A may be programmed to locate the command queue 42 and the event log buffer 44 in the memory 20. The IOMMU 26 (and more particularly the control logic 34) and/or the I/O memory manager 70 may update the control registers 32A as the command queue 42 and/or the event log buffer 44 are updated. In the present embodiment, the command queue 42 and the event log buffer 44 may both be circular buffers. When the last entry in the queue/buffer is read/written, the pointer wraps around to the first entry for the next read/write.

Specifically, the control registers 32A include head and tail pointers for the command queue 42 (Cmd Head and Cmd Tail), and a base address and size of the command queue (Cmd Base and Cmd Size). The base and size define the extent of the queue, and the head and tail pointers identify the next command to be executed and the last command added, respectively, in the command queue 42. The I/O memory manager 70 may add commands to the command queue 42 beginning at the tail pointer, then update the tail pointer to inform the IOMMU 26 of the commands. The IOMMU 26 may read commands from the entry indicated by the head pointer, and may update the head pointer to point to the next entry in the command queue 42. Similarly, the control registers 32A include head and tail pointers for the event log buffer 44 (EL Head and EL Tail) and a base address and size of the event log buffer 44 (EL Base and EL Size). The IOMMU 26 may write detected events to the event log buffer 44 beginning at the tail pointer, then update the tail pointer to reflect the added entries. The I/O memory manager 70 may read the events from the event log buffer 44 using the head pointer.

The I/O memory manager 70 may be a memory management module, or may be part of a memory management module that also handles memory management for the processor. The memory management module may comprise instructions which, when executed, manage the allocation of memory pages to processor and/or I/O virtual addresses. The memory management module may update the translation tables in memory to reflect the translations created by the memory management module and to delete translations for virtual pages that have been unmapped from the corresponding physical pages. The memory management module may be executed on one or more processors 12 in the computer system 10, and may be part of the operating system in some embodiments.

The I/O memory manager 70 may control the IOMMU 26 using control commands. Specifically, the I/O memory manager 70 may write control commands to the command queue 42 in the memory 20. The I/O memory manager 70 may use the command queue 42 to send a batch of two or more control commands to the IOMMU 26, while still permitting the IOMMU 26 to read the control commands and process them at its own pace. Similarly, the IOMMU 26 may be configured to detect various events during operation, and may inform the I/O memory manager 70 of the events in the event log buffer 44. The I/O memory manager 70 may process the events as desired.

The command queue 42 and the event log buffer 44 may provide elasticity in the interface between the I/O memory manager 70 and the IOMMU 26, permitting flexibility in both the I/O memory manager 70 and the IOMMU 26 that may simplify operation and/or improve performance. For example, the I/O memory manager 70 may write a batch of control commands, and other software may be executed by the processors while the control commands are processed by the IOMMU 26. Similarly, the event log may provide a robust interface for reporting events such as errors. The event log may be used to detect attempts to breach security of the computer system 10, and/or may also be a useful debugging aid when errors occur.

The control commands may include one or more invalidation commands. Since the I/O memory manager 70 updates the I/O translation tables 36, and it is possible that the updated translation data is cached in the IOMMU 26 (including any IOTLBs that may be downstream from the IOMMU 26), the I/O memory manager 70 may use the invalidation commands to ensure that stale translation data has been invalidated from the IOMMU 26. Additionally, the control commands may include a completion wait command. The completion wait command may be used to ensure that preceding commands have been completed prior to the completion of the completion wait command. Thus, the completion wait command may be used by the I/O memory manager 70 to synchronize the completion of a batch of commands. Once the completion wait command has completed, the I/O memory manager 70 knows that the preceding invalidations have been completed and there are no in-flight memory operations that have been translated using the invalidated translation data. Accordingly, the I/O memory manager 70 may invalidate a translation or translations in the I/O translation tables 36 by marking the entries invalid (or "not present"), and then write one or more invalidation commands specifying the entries to be invalidated in the command queue 42, followed by a completion wait command.

The use of the completion wait command, and certain rules followed by the IOMMU 26 to execute the completion wait command, may prevent interactions between the old translation to a given page and a new translation assigned to the page. For example, if a physical page is deallocated from an "old" translation (released by its current owner) and reallocated to a "new" translation (allocated to a new owner), data "leakage" may occur if a memory read request that was translated using the old translation is able to read the data in the original page after the new translation to that page has been established (and possibly written with data). Such operation may reduce the security of the system, since the data may be sensitive data that should be private to the new page owner. Similarly, silent data corruption may occur if a write memory request that was translated using the old translation updates the memory after the new translation has been established (possibly overwriting data placed in the page by the new page owner). Both data leakage and silent data corruption may be avoided, in some embodiments, using the rules described in more detail below.

The memory management module may be stored on a computer accessible medium. Generally speaking, a computer accessible medium may include any media accessible by a computer during use to provide instructions and/or data to the computer. For example, a computer accessible medium may include storage media. Storage media may include magnetic or optical media, e.g., disk (fixed or removable), tape, CD-ROM, or DVD-ROM, CD-R, CD-RW, DVD-R, DVD-RW. Storage media may also include volatile or non-volatile memory media such as RAM (e.g. synchronous dynamic RAM (SDRAM), Rambus DRAM (RDRAM), static RAM (SRAM), etc.), ROM, or Flash memory. Storage media may include non-volatile memory (e.g. Flash memory) accessible via a peripheral interface such as the Universal Serial Bus (USB) interface in a solid state disk form factor, etc. The computer accessible medium may include microelectromechanical systems (MEMS), as well as media accessible via transmission media or signals such as electrical, electromagnetic, or digital signals, conveyed via a communication medium such as a network and/or a wireless link.

Figure 4:
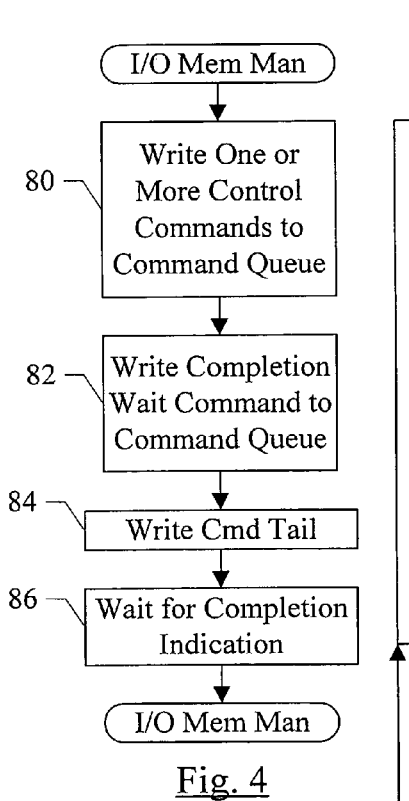
FIG. 4 is a flowchart illustrating one embodiment of an I/O memory manager generating control commands for an IOMMU.

Turning now to FIG. 4, a flowchart of one embodiment of the I/O memory manager 70 writing control commands to the command queue 42 is shown. While the blocks are shown in a particular order for ease of understanding, other orders may be used. The I/O memory manager 70 may comprise instructions which, when executed, implement the operations shown in the flowchart. The flowchart of FIG. 4 may apply any time that the I/O memory manager 70 is to communicate control commands to the IOMMU 26. For example, the flowchart of FIG. 4 may apply when the I/O memory manager 70 is reclaiming physical pages previously allocated to a particular translation for reallocation to another translation.

The I/O memory manager 70 may write one or more control commands to the command queue 42 to perform the desired operations on the IOMMU 26 (block 80). The first command in the sequence is written to the entry in the command queue 42 indicated by the tail pointer in the control registers 32A, and subsequent commands are written to consecutive entries, wrapping around if the last entry is used. The I/O memory manager 70 may be configured to check the head pointer to ensure that unexecuted, previously written commands are not overwritten.

The I/O memory manager 70 may write a completion wait command in the entry consecutive to the last entry written with a control command (block 82), and the I/O memory manager 70 may update the tail pointer to point to the entry consecutive to the completion wait command (block 84). Updating the tail pointer informs the IOMMU 26 that the new commands are awaiting execution. If the IOMMU 26 is still executing previous commands, the IOMMU 26 processes the previous commands first. In general, the IOMMU 26 may process commands from the command queue 42 in first in, first out order, although execution of commands may be concurrent. That is, the IOMMU 26 need not complete a given command prior to beginning execution of a subsequent command, generally. It is noted that the I/O memory manager 70 may write one or more commands to the command queue 42 and update the tail pointer without inserting a completion wait command. For example, if the I/O memory manager 70 does not require immediate notification that commands have been completed, then inserting the completion wait command may not be desired. Subsequently, a completion wait command may be used to determine that all previous commands have been completed, even ones that may have been processed before the completion wait command was issued to the command queue 42.

The I/O memory manager 70 may wait for a completion indication from the IOMMU 26 to indicate that the completion wait command (and thus preceding commands) have been completed (block 86). The completion indication may be any desired indication that can be detected by the I/O memory manager 70. For example, the completion indication could be written to one of the control registers 32, and the I/O memory manager 70 may poll the control register 32 periodically. Alternatively, the completion indication may be an interrupt of the processor 12, and the I/O memory manager 70 may exit after updating the tail pointer. Servicing the interrupt may include calling the I/O memory manager 70. In yet another alternative, the completion wait command may include one or more operands specifying a memory location to be written and the data to write to the memory location, and the write to the memory location of the data may be the completion indication. In some embodiments, two or more completion indications may be supported, and may be selected by the coding of the completion wait command.

Once the completion indication is received, the I/O memory manager 70 is free to continue with mapping the physical page to a new virtual page, since the old translation's cached versions, if any, have been invalidated and any memory requests that were translated using the old translation have been completed.

Figure 5:
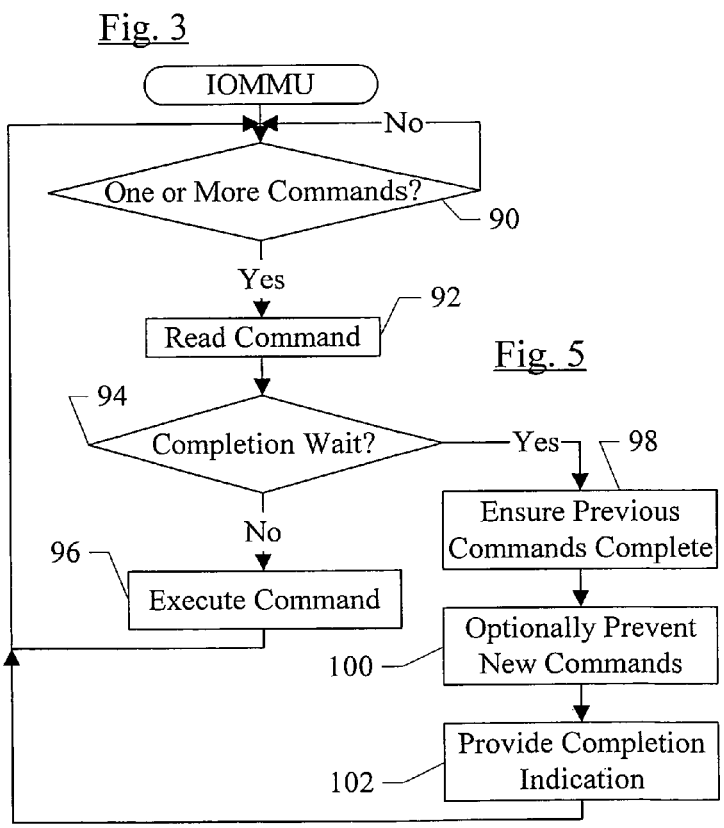
FIG. 5 is a flowchart illustrating one embodiment of an IOMMU processing control commands.

Turning now to FIG. 5, a flowchart illustrating operation of one embodiment of the IOMMU 26 (and more particularly the control logic 34, in one embodiment), to process control commands from the command queue 42 is shown. While the blocks are shown in a particular order for ease of understanding, other orders may be used. Furthermore, blocks may be performed in parallel by combinatorial logic in the IOMMU 26/control logic 34. Blocks, combinations of blocks, and/or the flowchart as a whole may be pipelined over multiple clock cycles.

If there are no commands in the command queue 42 (e.g. the tail pointer is equal to the head pointer—decision block 90, "no" leg), the command processing logic is idle. If there is at least one control command in the command queue 42 (decision block 90, "yes" leg), the IOMMU 26 may read the control command at the head of the command queue 42 (block 92), as indicated by the head pointer. The IOMMU 26 may also update the head pointer to indicate that the command has been read. If the command is not the completion wait command (decision block 94, "no" leg), the IOMMU 26 may execute the command (block 96) and determine if there is another command in the command queue 42 (decision block 90). As mentioned previously, the execution of commands may be overlapped, in some embodiments.

If the control command is a completion wait command (decision block 94, "yes" leg), the IOMMU 26 may ensure that previous commands have been completed (block 98). In one embodiment, ensuring that previous invalidation commands have been completed may include ensuring that any memory requests that are dependent on the invalidated translation are also completed and are visible to the system. Various embodiments may be more or less exact on the rules for completing memory requests. For example, an embodiment may complete all outstanding memory requests sourced by an I/O device to ensure that memory requests that are dependent on the invalidated translation have been completed and are visible to the system. Other embodiments may track memory requests and which translations they depend on, at some level of granularity, and complete those memory requests prior to completing the invalidation commands. Generally, a memory request may be dependent on a translation if translating the virtual address of the memory request uses any of the translation data that is being invalidated. For example, for a tree structure such as the x86 compatible page tables, a memory request may depend on a page table entry if that entry is used as part of the translation of the virtual address, even if it is not the last page table entry read in the tree for the translation. A lower level of granularity may track which page tables are accessed (via the pointers in the page table entries that are selected during the table walk for the translation). If a given page table is changed, the translation may be considered to be dependent on the translation being invalidated, for that embodiment.

Figure 6:
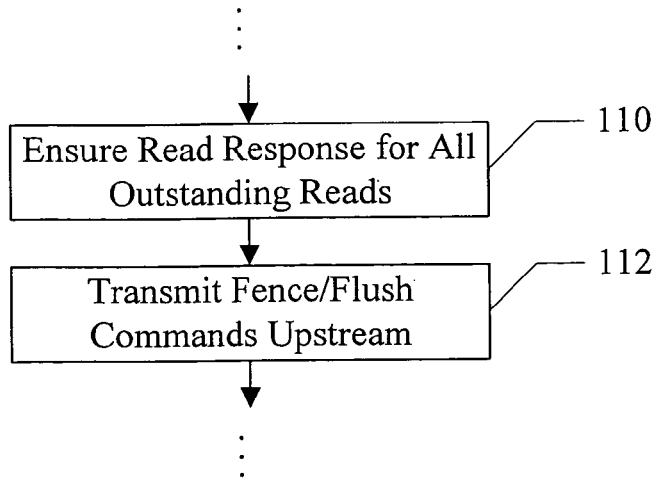
FIG. 6 is a flowchart illustrating one embodiment of ensuring outstanding operations are complete from the flowchart of FIG. 5.

FIG. 6 is a flowchart illustrating one embodiment of a mechanism for ensuring that memory requests that depend on a translation have completed (block 98 in FIG. 5). While the blocks are shown in a particular order for ease of understanding, other orders may be used. Furthermore, blocks may be performed in parallel by combinatorial logic in the IOMMU 26/control logic 34. Blocks, combinations of blocks, and/or the flowchart as a whole may be pipelined over multiple clock cycles.

For each memory read request that is outstanding and dependent on the translation, the IOMMU 26 may ensure that the corresponding read response (with read data or an error indication, in various embodiments) has been received at the IOMMU 26 (block 110). To ensure that memory write requests that have already been translated have been completed (or at least have been pushed to the host bridge where the requests enter the coherent fabric of the computer system 10), the IOMMU 26 may transmit a fence command upstream in each posted virtual channel if posted traffic has been transmitted in the posted virtual channel. Additionally, the IOMMU 26 may transmit the fence command upstream followed by a flush command in an IOMMU posted virtual channel, if traffic has been transmitted in the IOMMU posted virtual channel (block 112). The IOMMU posted virtual channel may be one of a set of virtual channels dedicated to IOMMU use, in one embodiment. Additional details are provided for one such embodiment below. If the flush command is issued, the IOMMU 26 may await a response to the flush before signalling that the completion wait command has completed. If no flush command is issued, the completion wait command may be indicated as completed immediately, in some embodiments. For example, the completion indication may be transmitted via a posted write, which may travel behind the fence command in the IOMMU posted virtual channel and thus may not reach the host until the fence command has completed. A fence command may generally provide a barrier between memory write requests. Memory write requests transmitted prior to the fence will reach the host bridge prior to memory write requests transmitted subsequent to the fence. Thus, by transmitting a fence command, subsequent write requests (possibly using the new translation for the physical page) will arrive after any outstanding write requests. The flush command may ensure that any previous memory write requests have reached the targeted memory locations. The terms "upstream" and "downstream" may refer to the direction of a communication with regard to the host processors and/or memory. Upstream is flowing toward the host processor and/or memory, downstream is flowing away from the host processor and/or memory.

Returning to FIG. 5, the IOMMU may also optionally prevent initiating execution of new commands (subsequent to the completion wait command in the command queue 42) until the completion wait command has completed (block 100). In one embodiment, the completion wait command may comprise an attribute that determines whether or not the new commands are inhibited. Once the previous commands have been completed, the IOMMU 26 may provide the completion indication (block 102) and execution of the completion wait command is complete.

Figure 7:
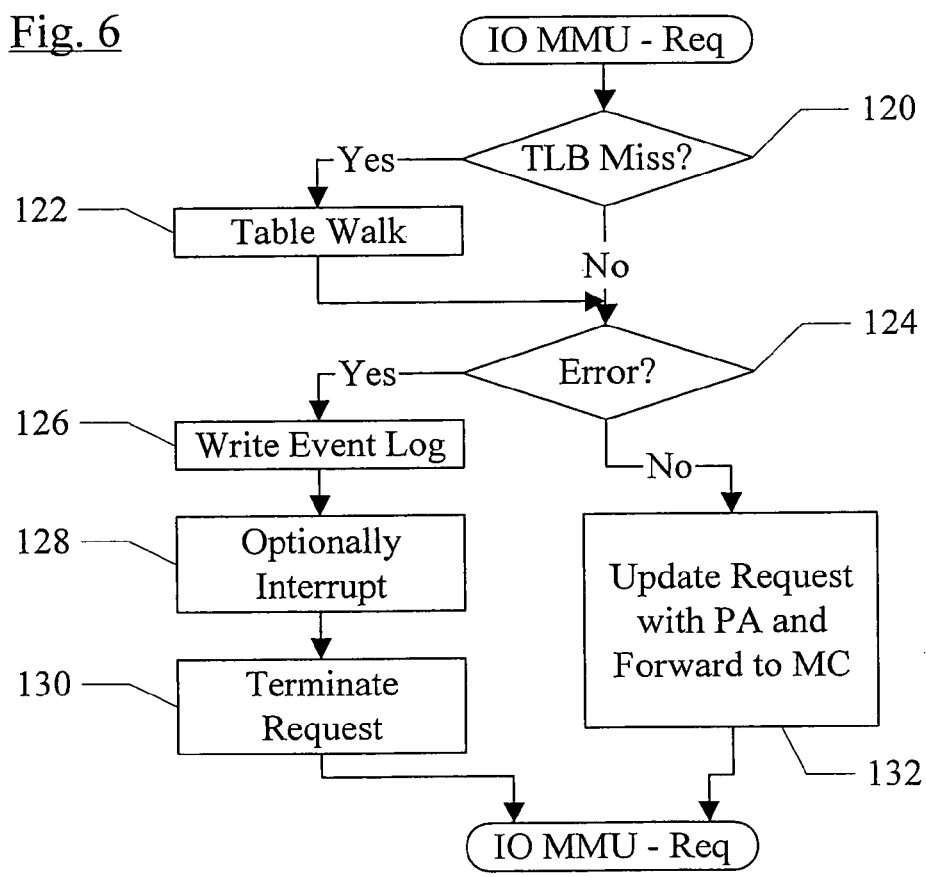
FIG. 7 is a flowchart illustrating one embodiment of an IOMMU handling a memory request from an I/O device.

Turning next to FIG. 7, a flowchart is shown illustrating operation of one embodiment of the IOMMU 26 (and more particularly the control logic 34 and the table walker 28, in one embodiment), to translate a memory request sourced by an I/O device 22. While the blocks are shown in a particular order for ease of understanding, other orders may be used. Furthermore, blocks may be performed in parallel by combinatorial logic in the IOMMU 26/control logic 34/table walker 28. Blocks, combinations of blocks, and/or the flowchart as a whole may be pipelined over multiple clock cycles.

The IOMMU 26 may determine if the virtual address in the memory request is a miss in the IOTLB 30 (decision block 120). In some embodiments, a memory request may be translated in an IOTLB 24 in an I/O device 22, and the memory request may be flagged as a TLB miss if no translation is found in the IOTLB 24. The decision block 120 may represent checking the memory request for an indication of TLB miss, in some embodiments. Embodiments that include an IOTLB 24 may also flag a request as having been translated, and the IOMMU 26 may pass such requests without attempting translations.

If the memory request is a TLB miss (decision block 120, "yes" leg), the IOMMU 26 may perform a table walk (e.g. the control logic 34 may invoke the table walker 26—block 122). The table walk may complete successfully, loading a translation into the IOTLB 30, or no translation may be found. Not finding a translation is an I/O page fault, and is considered an error in this embodiment. Other errors may include a permission violation (the translation does not permit the memory request, such as a memory write to a read-only page) or a memory failure when issuing table walk reads to system memory. The errors may be events that the IOMMU 26 logs in the event log buffer 44. Other, non-error events may also be defined in various embodiments.

If an error occurs during translation for the memory request (decision block 124, "yes" leg), the IOMMU 26 may generate an event describing the error and may write the error to the event log buffer 44 (block 126). Depending on the configuration of the IOMMU 26, the IOMMU 26 may optionally interrupt a processor to indicate the event log write (block 128). For example, the IOMMU 26 may be programmable in the control registers 30 to generate an interrupt on an event log write (or after a programmable or fixed number of event log writes). Other embodiments may be hard coded to generate an interrupt after an event log write or a specified number of event log writes. Additionally, the IOMMU 26 may terminate the request (block 130). If the termination can be communicated to the sourcing I/O device (e.g. a read or a non-posted write), the IOMMU 26 may terminate the request at the source (e.g. transmitting a read response with an error, or transmitting a completion response for the non-posted write with an error). If not (e.g. a posted write), the request may be dropped by the IOMMU 26.

If the translation of the memory request completes without error (decision block 124, "no" leg), the IOMMU 26 may update the request with the translated physical address (PA) and the request may be forwarded upstream toward the memory controller 18 (block 132).

It is noted that other errors may be detected, in various embodiments, during the progress of a memory request after it has been successfully transmitted. Errors that can be detected by the IOMMU 26 may also be logged in the event log, similar to blocks 126, 128, and 130 shown in FIG. 7.

Figure 8:
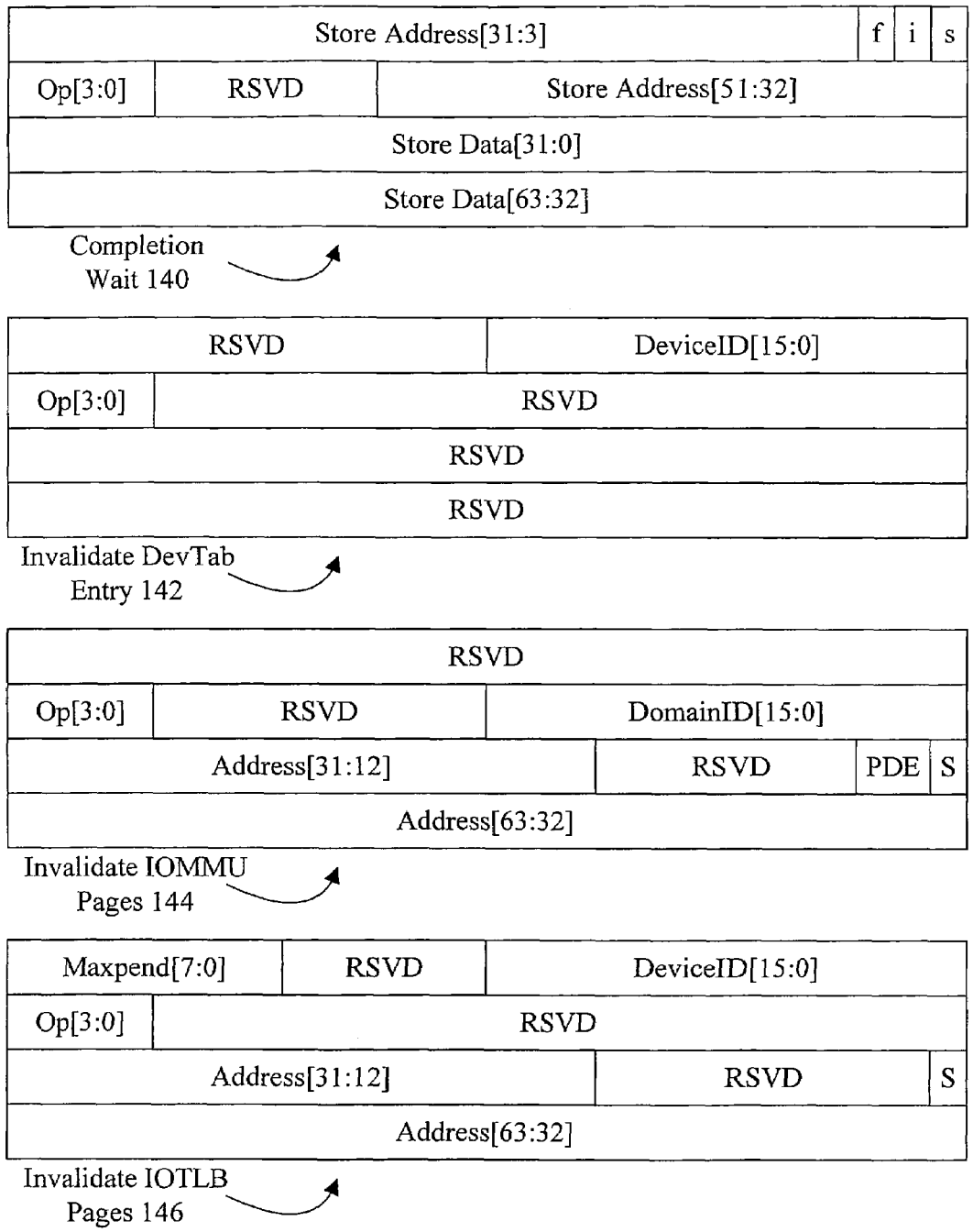
FIG. 8 is a block diagram of exemplary control commands for one embodiment.

Turning next to FIG. 8, a block diagram illustrating exemplary control commands for one embodiment of the IOMMU 26 is shown. Each field (except for reserved fields) that does not include a bit range may be a single bit. Reserved fields are marked "RSVD". While specific fields, locations of fields, sizes of fields, etc. are shown, any set of control commands may be used including those that arrange the fields differently or that include different fields or combinations of one or more fields shown and different fields. In FIG. 8, each row of may comprise 32 bits, and rows are shown in increasing memory order (e.g. the first row of a command as shown in FIG. 8 may be at the lowest memory address, the next row may be at the address of the first row plus 4 bytes for 32 bit rows, etc.).

In the illustrated embodiment, the control commands include the completion wait command 140, an invalidate device table (DevTab) entry command 142, an invalidate IOMMU pages command 144, and an invalidate IOTLB pages command 146. The opcode field (Op[3:0]) identifies the command, and the other fields may be defined on a command by command basis. In one embodiment the following opcode field encodings may be used for the opcode, although any encodings may used in various embodiments: b'0001'=completion wait; b'0010'=invalidate DevTab entry; b'0011'=invalidate IOMMU pages; and b'0100'=invalidate IOTLB pages.

The completion wait command 140 has been generally described previously. The store address and store data fields may be used to specify the address and data of a write that may be used as a completion indication. The "s" bit may be set to indicate that the write should be used. The "i" bit may be set to indicate that an interrupt is to be signalled as a completion indication. In one embodiment, if the "i" bit is set, the IOMMU unit 26 may set a bit in a control register 32, and another control register bit may be used to enable the interrupt. If the interrupt is enabled, the IOMMU 26 may signal the interrupt. The "f" bit may control whether or not subsequent commands in the command queue 42 are delayed by the IOMMU 26 until the completion wait command 140 is complete. For example, the subsequent command may be delayed if the "f" bit is set. The IOMMU 26 may not be inhibited from starting execution of the subsequent commands if the "f" bit is clear (although some embodiments may delay the subsequent commands independent of the "f" bit, if desired). The set and clear states of an of the above bits may be reversed, in other embodiments. Both the "i" bit and the "s" bit may be set, in some embodiments, and both the write and the interrupt may be provided as completion indications.

As mentioned previously, one embodiment of the I/O translation tables 36 may comprise a device table, indexed by a device ID assigned to the sourcing device of a memory request. The device table may store pointers to sets of page tables (although devices may share sets of page tables if the device table is written with the same pointer in one or more entries). Additionally, the device table entries may include other protection bits, and particularly a domain ID. Different devices may be placed into the same domain by using the same domain ID in their device table entries. If the devices use different sets of I/O page tables, then different domain IDs are assigned. Devices that have the same set of I/O page tables (via the same pointer to the set of page tables in the device table entries) may have the same domain ID, if desired. The domain ID may be used to tag IOTLB entries. The page tables may be indexed by virtual address bits from the request, and may point to other page tables or may include the physical address that completes the translation. Various protection bits may be specified in one or more page table entries that are accessed for a given translation.

The invalidate DevTab entry command 142 may specify a device table entry (by the device ID provided in the device ID field of the command) to invalidate. If the IOMMU 26 is caching the device table entry, the entry is invalidated. The invalidate IOMMU pages command 144 may be used to invalidate one or more page translation entries. The domain ID may specify the domain for which entries are being invalidated. If the "s" bit is clear, the address specifies one page to be invalidate. If the "s" bit is set, the range of pages to be invalidated is specified by the position of the least significant zero bit of the address field. If PDE bit is set, the corresponding page directory entries are also invalidated, if cached. The invalidate IOTLB pages command 146 may be used to invalidate IOTLB entries in remote IOTLBs such as the IOTLB 24 shown in FIG. 1. The "s" bit is used similar to the "s" bit in the invalidate IOMMU pages command 144. The Maxpend field may specify how many invalidate IOTLB commands may be in flight to a given device ID. The IOMMU 26 forwards the invalidate IOTLB commands to the I/O device 22 identified by the device ID, and tracks how many such commands have not been completed yet by the I/O device 22. If Maxpend commands are in flight, the IOMMU 26 may delay transmission of the command until a preceding command completes.

The IOMMU 26 may cache translation data in a variety of fashions. For example, the IOMMU 26 may directly cache translation data from the memory locations from the I/O translation tables 36. Additionally, a translation for which the result is cached in the IOTLB may be affected by the translation data from various entries in the I/O translation tables 36. Both direct caching and caching via TLB may be referred to as caching data in the IOMMU 26, in general.

Accordingly the I/O memory manager 70 may completely invalidate a set of translations for a domain by invalidating the entries in the I/O translation tables 36, issuing the invalidate DevTab entry command 142 for each device ID in the domain, issuing the invalidate IOMMU pages command 144 for the pages in the domain, and issuing the invalidate IOTLB pages command 146 for the pages in the domain and for each device in the domain that includes an IOTLB 24. The preceding order may be the order to use for correctness, in one embodiment. To invalidate a given page translation, the I/O translation tables 36 may be updated, followed by the invalidate IOMMU pages command 144 and the invalidate IOTLB pages command 146, if applicable.

In one embodiment, the IOMMU 26 may also implement interrupt remapping. In such an embodiment, an invalidate remapping command may also be supported.

Figures 9, 10:
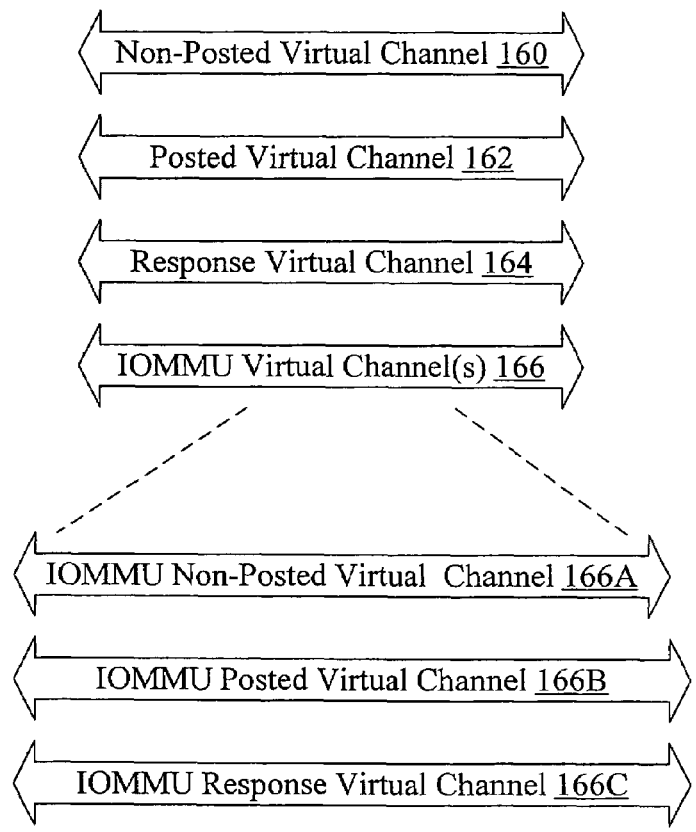
FIG. 9 is a block diagram of one embodiment of a generic event log entry.
FIG. 10 is a diagram illustrating one embodiment of I/O virtual channels.

Turning next to FIG. 9, a block diagram of one embodiment of an event log entry 150 is shown. Each field (except for reserved fields) that does not include a bit range may be a single bit. Reserved fields are marked "RSVD". While specific fields, locations of fields, sizes of fields, etc. are shown, any set of events may be used including those that arrange the fields differently or that include different fields or combinations of one or more fields shown and different fields. In FIG. 9, each row of the event log entry may comprise 32 bits, and rows are shown in increasing memory order (e.g. the first row of an entry as shown in FIG. 9 may be at the lowest memory address, the next row may be at the address of the first row plus 4 bytes for 32 bit rows, etc.).

FIG. 9 illustrates a generic event log entry. Each event is coded as a different event code in the event code field (EvtCd [3:0]). The events may have event-specific data in the Event_Specific field. Additionally, various event log entries may include a device ID and/or a domain ID associated with the event, if any. Various events may also have an associated address in the address field of the event log entry. In the description below, if a given event does not have a description for one of the fields in the generic entry 150, that field may be reserved for that event.

In one embodiment, the events may include the following events and codes, although other embodiments may use any set of events and any set of event code: b'0001'=illegal device table entry; b'0010'=I/O page fault; b'0011'=device table hardware error; b'0100'=page table hardware error; b'0101'=illegal command error; b'0110'=command hardware error; b'011'=IOTLB invalidate timeout error; b'1000'=invalid device request.

The illegal device table entry event may be logged if the IOMMU detects that the device table entry selected for a given translation is not proper is some fashion. The event specific data may include an indication of whether the memory request that caused the lookup was a read or write, as well as an indication of whether the entry was accessed as part of a translation request (e.g. from an I/O device that includes its own IOTLB). The address field may be the virtual address of the request, and the device ID field may include the device ID of the requesting device.

The I/O page fault event may be logged if the IOMMU detects an I/O page fault. The device ID and domain ID fields indicate the requesting I/O device and the domain that the device is included in. The address field may be the virtual address of the request. The event specific data may identify the various types of I/O page faults. For example, the types may include: page not present; permission violation; and bad page table entry. Additionally, the event specific data may indicate whether the memory request for which the page fault was detected during translation is a read or a write.

The device table hardware error event may be logged if a hardware error is detected during a device table access. For example, the error may include aborted transaction or data error. The event specific data may identify the type of hardware error, as well as indications of whether the device table access was to translate or read or write request or was in response to a translation request from an I/O device. The device ID identifies the requesting device, and the address field is the virtual address of the request.

The page table hardware error similarly may be logged if a hardware error is detected during a page access. For example, the error may include aborted transaction or data error. The event specific data may identify the type of hardware error, as well as indications of whether the page table access was to translate or read or write request or was in response to a translation request from an I/O device. The device ID and domain ID identify the requesting device and its domain. The address field is the physical address of the failed page table access.

The illegal command error may be logged if the IOMMU 26 reads an illegal command from the command queue 42. The IOMMU 26 may stop fetching commands in response to detecting the illegal command, in some embodiments. The address field is the physical address at which the illegal command is stored.

The command hardware error may be logged if a hardware error is detected when reading a command from the command queue 42. For example, the error may include aborted transaction or data error. The IOMMU 26 may stop fetching commands in response to detecting the error, in some embodiments. The event specific data may identify the type of hardware error. The address field is the physical address of the failed command read.

The IOTLB invalidate timeout error may be logged if the IOMMU 26 detects a timeout without receiving a response to a forwarded invalidate IOTLB pages command. The device ID identifies the device targeted by the invalidate IOTLB pages command, and the address field is the address supplied in the invalidate IOTLB pages command.

The invalid device request event may be logged if the IOMMU 26 detects a request from a device that the device is not permitted to perform. The event specific data may identify the type of invalid request (e.g. a translation request or a request flagged as translated from a device that does not have translation capability, such as the IOTLB 24; or an I/O space request from a device that is not permitted to make such requests). The device ID field identifies the requesting device, and the address field may include an address from the invalid request.

Turning now to FIG. 10, a block diagram illustrating one embodiment of a set of virtual channels that may be implemented at the IOMMU 26 and upstream to the memory 20 is shown. The virtual channels may include the virtual channels of the underlying I/O interconnect, as well as at least one additional virtual channel. For example, FIG. 10 illustrates the virtual channels used on the HT I/O link, including the non-posted virtual channel 160, the posted virtual channel 162, and the response virtual channel 164. Among other things, memory read requests and non-posted memory write requests travel in the non-posted virtual channel 160, posted memory write requests travel in the posted virtual channel 162, and responses to the requests in the posted and non-posted virtual channels travel in the response virtual channel 164.

The IOMMU also sources memory requests to read and write the I/O translation tables 36, the command queue 42, and the event log buffer 44. The requests to the I/O translation tables 36 may need to complete before the memory requests in the posted and non-posted channels for which translations are being gathered. The IOMMU-sourced memory requests to the I/O translation tables 36 would normally travel in the non-posted virtual channel 160, but that could cause deadlock since the I/O device-sourced requests travel in that channel.

For example, consider a system that includes an IOMMU providing translations for several I/O devices, and in which device-to-device (peer-to-peer) traffic flows through a bridge to the I/O system that is on the other side of the IOMMU from the devices (such as the Northbridge in personal computers). Such a system may experience deadlock if dedicated virtual channel(s) for the IOMMU aren't used. For example, a first device may issue reads to a second device, which may hit in the IOMMU and thus may be passed to the second device (through the bridge). The second device may issue a write to memory that misses in the IOMMU, and thus the IOMMU begins table walk reads to translate the write. The second device may also issue read responses for the reads from the first device (which again are to pass through the bridge to the first device). Without the IOMMU virtual channels, deadlock may occur because: the write from the second device is stalled awaiting the table walk read (dependency created by the IOMMU); the table walk read is stalled behind the reads sent by the first device to the second device; the second device cannot accept more reads until the read responses are transmitted; and the previously transmitted read responses are stalled behind the write.

To ensure deadlock free operation, at least one additional virtual channel may be defined (the IOMMU virtual channel (s) 166 in FIG. 10). The IOMMU-sourced memory requests may travel in the IOMMU virtual channel(s) 166. More than one IOMMU virtual channel may be created in some embodiments, if desired. In FIG. 10, the IOMMU virtual channels 166 are shown in exploded view to include an IOMMU non-posted virtual channel 166A, an IOMMU posted virtual channel 166B, and an IOMMU response virtual channel 166C The IOMMU virtual channel(s) may be dedicated for IOMMU use, in some embodiments. In one embodiment, the IOMMU virtual channel may share the isochronous virtual channel defined in the HT I/O specification. If the IOMMU virtual channel (non-posted) is shared with other device traffic, deadlock free operation may requires certain system level restrictions. For example peer-to-peer traffic routing may not be permitted in the shared channel.

Generally speaking, a "virtual channel" may comprise a communication path for carrying traffic between sources and destination. Each virtual channel is resource-independent of the other virtual channels (i.e. data flowing in one virtual channel is generally not affected, in terms of physical transmission, by the presence or absence of data in another virtual channel). Data in the same virtual channel may physically conflict with each other (i.e. data in the same virtual channel may experience resource conflicts), but may not physically conflict with the transmission of data in a different virtual channel. Thus, data (e.g. requests) that may logically conflict, such as needing to complete before or after each other, may be assigned to different virtual channels. While virtual channels are resource independent (e.g. they may use independent buffering), they may still share certain physical entities. For example, the physical transmission channel may be shared, and multiplexed among the virtual channels according to buffer availability on the receiving end of the channel. However, the inability of one virtual channel to use a shared resource, such as a physical transmission medium, may not block the use of the shared resource by another channel. One way the virtual channels may be implemented is to provide logically independent buffering for each channel at either end of a shared physical transmission medium.

Numerous variations and modifications will become apparent to those skilled in the art once the above disclosure is fully appreciated. It is intended that the following claims be interpreted to embrace all such variations and modifications.

What is claimed is:

1. A method comprising:
   creating a command queue in a system memory of a computer system that also includes an input/output memory management unit (IOMMU) configured to implement address translation and memory protection for memory requests sourced by one or more input/output (I/O) devices in the computer system;
   writing one or more control commands to the command queue by a memory management module executable on a processor in the computer system; and
   the IOMMU reading the control commands from the command queue and executing the commands, wherein the control commands comprise invalidate commands defined to invalidate cached translation data in the IOMMU, wherein the cached translation data is used by the IOMMU to perform the address translation and memory protection for memory requests sourced by the I/O devices.

2. The method as recited in claim 1 wherein at least one of the I/O devices comprises an I/O translation lookaside buffer (IOTLB), and wherein the invalidate commands include a command to invalidate one or more entries in the IOTLB.

3. The method as recited in claim 1 wherein I/O devices are mapped to translation tables in the memory through a device table, and wherein the invalidate commands include a command to invalidate one or more cached device table entries.

4. The method as recited in claim 1 wherein the control commands comprise a completion wait command, wherein the method further comprises the IOMMU completing preceding control commands prior to completing the completion wait command.

5. The method as recited in claim 4 further comprising the IOMMU providing a completion indication responsive to executing the completion wait command.

6. The method as recited in claim 5 wherein the completion indication is an interrupt of a processor in the computer system.

7. The method as recited in claim 5 wherein the completion indication comprises a write to a memory location of the memory identified by an address operand of the completion wait command, wherein the write data is also an operand of the completion wait command.

8. The method as recited in claim 5 wherein writing one or more control commands comprising writing one or more control commands followed by the completion wait command, wherein the memory management unit determines that the preceding control commands have completed by detecting the completion indication.

9. The method as recited in claim 1 further comprising:
creating an event log in the system memory;
the IOMMU detecting one or more events;
the IOMMU writing the events to the event log; and
the memory management module reading the events from the event log.

10. The method as recited in claim 9 further comprising the IOMMU sending an interrupt to a processor subsequent to writing one or more events into the event log.

11. The method as recited in claim 1 wherein the system memory is a target of the memory requests sourced by the one or more I/O devices.

12. A method comprising:
creating a command queue in a memory of a computer system that also includes an input/output memory management unit (IOMMU) configured to implement address translation and memory protection for memory requests sourced by one or more input/output (I/O) devices in the system;
writing one or more control commands to the command queue by a memory management module executable on a processor in the computer system;
the IOMMU reading the control commands from the command queue and executing the commands, wherein the control commands comprise a completion wait command;
the IOMMU completing preceding control commands prior to completing the completion wait command, and wherein the completion wait command comprises an attribute specifying whether or not to inhibit initiation of subsequent commands to the completion wait command prior to completing the completion wait command; and
inhibiting initiation of the subsequent commands responsive to the attribute.

13. The method as recited in claim 12 further comprising the IOMMU providing a completion indication responsive to executing the completion wait command.

14. The method as recited in claim 13 wherein the completion indication is an interrupt of a processor in the computer system.

15. The method as recited in claim 13 wherein the completion indication comprises a write to a memory location of the memory identified by an address operand of the completion wait command, wherein the write data is also an operand of the completion wait command.

16. The method as recited in claim 13 wherein writing one or more control commands comprising writing one or more control commands followed by the completion wait command, wherein the memory management unit determines that the preceding control commands have completed by detecting the completion indication.

17. A computer system comprising:
a processor;
a memory management module comprising a plurality of instructions executable on the processor;
an input/output memory management unit (IOMMU) configured to implement address translation and memory protection for memory operations sourced by one or more input/output (I/O) devices; and
a memory subsystem comprising a memory controller and a memory coupled to the memory controller;
wherein the memory stores a command queue during use, and wherein the memory management module is configured to write one or more control commands to the command queue, and wherein the IOMMU is configured to read the control commands from the command queue and execute the control commands, and wherein the control commands comprise invalidate commands defined to invalidate cached translation data in the IOMMU, wherein the cached translation data is used by the IOMMU to perform the address translation and memory protection for memory requests sourced by the I/O devices.

18. The computer system as recited in claim 17 wherein the control commands comprise a completion wait command, wherein the IOMMU is configured to complete preceding control commands prior to competing the completion wait command.

19. The computer system as recited in claim 18 wherein the IOMMU is configured to provide a completion indication responsive to executing the completion wait command.

20. The computer system as recited in claim 19 wherein the completion indication is an interrupt of the processor.

21. The computer system as recited in claim 19 wherein the completion indication comprises a write to a memory location of the memory identified by an address operand of the completion wait command, wherein the write data is also an operand of the completion wait command.

22. The computer system as recited in claim 17 further comprising a second memory management unit (MMU) coupled to the processor and configured to provide address translation and memory protection for memory requests sourced by the processor.

23. The computer system as recited in claim 17 wherein the memory is configured to store an event log during use, and wherein the IOMMU is configured to write detected events to the event log, and the memory management module is configured to read the events from the event log.

24. The computer system as recited in claim 23 wherein the IOMMU is configured to send an interrupt to the processor subsequent to writing the detected events to the event log.

25. The computer system as recited in claim 17 wherein the memory is a target of the memory operations sourced by the one or more I/O devices.

26. A computer system comprising:

a processor;

a memory management module comprising a plurality of instructions executable on the processor;

a memory coupled to the processor; and an input/output memory management unit (IOMMU) coupled to the memory and configured to implement address translation and memory protection for memory operations sourced by one or more input/output (I/O) devices;

wherein the memory stores a command queue during use, and wherein the memory management module is configured to write one or more control commands to the command queue, and wherein the IOMMU is configured to read the control commands from the command queue and execute the control commands, wherein the control commands comprise a completion wait command, wherein the IOMMU is configured to complete preceding control commands prior to competing the completion wait command, and wherein the completion wait command comprises an attribute specifying whether or not to inhibit initiation of subsequent commands to the completion wait command prior to completing the completion wait command, wherein the IOMMU is configured to inhibit initiation of the subsequent commands responsive to the attribute.

27. The computer system as recited in claim 26 wherein the IOMMU is configured to provide a completion indication responsive to executing the completion wait command.

28. The computer system as recited in claim 27 wherein the completion indication is an interrupt of the processor.

29. The computer system as recited in claim 27 wherein the completion indication comprises a write to a memory location of the memory identified by an address operand of the completion wait command, wherein the write data is also an operand of the completion wait command.

30. An input/output memory management unit (IOMMU) comprising:

one or more control registers programmable to locate a command queue in system memory;

a cache to cache translation data from the system memory; and a control logic coupled to the cache and the control registers, wherein the control logic is configured to execute the control commands from the command queue, and wherein the control logic is configured to implement address translation and memory protection for memory requests sourced from one or more input/output (I/O) devices, and wherein the control commands comprise invalidate commands defined to invalidate cached translation data in the IOMMU, wherein the cached translation data is used by the IOMMU to perform the address translation and memory protection for memory requests sourced by the I/O devices.

31. The IOMMU as recited in claim 30 wherein the cache comprises a translation lookaside buffer.

32. The IOMMU as recited in claim 30 wherein the control logic is configured to write to an event log in the memory.

* * * * *